US011358567B2

(12) United States Patent
Oakes et al.

(10) Patent No.: US 11,358,567 B2
(45) Date of Patent: Jun. 14, 2022

(54) WIPER ARTICULATION SYSTEM

(71) Applicant: GM Global Technology Operations LLC, Detroit, MI (US)

(72) Inventors: Jonathan L. Oakes, Sterling Heights, MI (US); Robert A. Hrabak, Sterling Heights, MI (US); Jared Phillips, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 524 days.

(21) Appl. No.: 16/247,106

(22) Filed: Jan. 14, 2019

(65) Prior Publication Data

US 2020/0223400 A1 Jul. 16, 2020

(51) Int. Cl.
*B60S 1/36* (2006.01)
*B60S 1/08* (2006.01)
*B60S 1/34* (2006.01)
*B60S 1/24* (2006.01)

(52) U.S. Cl.
CPC .............. *B60S 1/365* (2013.01); *B60S 1/08* (2013.01); *B60S 1/24* (2013.01); *B60S 1/245* (2013.01); *B60S 1/3425* (2013.01); *B60S 1/36* (2013.01)

(58) Field of Classification Search
CPC .... B60S 1/245; B60S 1/24; B60S 1/36; B60S 1/365; B60S 1/08; B60S 1/3425; B60S 1/3409; B60S 1/3404; B60S 1/3447; B60S 1/345; B60S 1/166; B60S 1/18
USPC .............................. 15/250.3, 250.21, 250.23
See application file for complete search history.

(56) References Cited

U.S. PATENT DOCUMENTS

| 1,660,971 | A | * | 2/1928 | Lindner | B60S 1/365 |
| | | | | | 15/250.23 |
| 3,003,172 | A | * | 10/1961 | Harris | B60S 1/245 |
| | | | | | 15/250.23 |
| 3,010,137 | A | * | 11/1961 | Krohm | B60S 1/36 |
| | | | | | 15/250.21 |

(Continued)

FOREIGN PATENT DOCUMENTS

| FR | 2613302 | * | 10/1988 |
| WO | 03047929 A1 | | 6/2003 |

OTHER PUBLICATIONS

Machine translation of description portion of French publication 2613302, published Oct. 1988. (Year: 1988).*

*Primary Examiner* — Gary K. Graham
(74) *Attorney, Agent, or Firm* — Vivacqua Crane PLLC

(57) ABSTRACT

An automobile vehicle wiper arm system includes a wiper arm base rotatably connected to a fixed structural member. A wiper arm extension is slidably disposed to the wiper arm base during wiper arm base travel about an arc of travel. A motion link is rotatably connected to the wiper arm extension and is rotatably connected to the fixed structural member. The motion link induces the wiper arm extension to outwardly displace and inwardly displace opposite to the outward displacement during wiper arm base rotation about the arc of travel. A wiper blade is connected to the wiper arm extension and traverses an oval-shaped travel arc along a vehicle windshield by the slidable displacement of the wiper arm extension during wiper arm base rotation. A linkage group connects the wiper arm extension to a wiper motor with rotation of the wiper arm base induced by operation of the wiper motor.

18 Claims, 5 Drawing Sheets

(56) References Cited

U.S. PATENT DOCUMENTS

| | | | | |
|---|---|---|---|---|
| 3,125,777 | A | * | 3/1964 | Leninger ................ B60S 1/245 15/250.14 |
| 3,831,220 | A | * | 8/1974 | Gmeiner ................ B60S 1/365 15/250.21 |
| 4,672,709 | A | * | 6/1987 | Licata .................... B60S 1/245 15/250.21 |
| 4,831,679 | A | * | 5/1989 | Guerard ................ B60S 1/365 15/250.21 |
| 4,847,941 | A | * | 7/1989 | Kuhbauch .............. B60S 1/365 15/250.21 |
| 4,868,947 | A | * | 9/1989 | Sahara .................... B60S 1/365 15/250.21 |
| 4,918,780 | A | * | 4/1990 | Scorsiroli ............... B60S 1/365 15/250.21 |
| 5,369,837 | A | * | 12/1994 | Chevroulet ............ B60S 1/365 15/250.21 |
| 6,591,444 | B1 | * | 7/2003 | Hoshino ................ B60S 1/245 15/250.27 |
| 6,732,400 | B1 | * | 5/2004 | Zimmer ................ B60S 1/3409 15/250.3 |
| 6,966,095 | B2 | * | 11/2005 | Brown .................... B60S 1/24 15/250.21 |

\* cited by examiner

WIPER ARTICULATION SYSTEM

INTRODUCTION

The present disclosure relates to automobile vehicle windshield wiper systems.

New streamlined vehicle designs are forcing automobile vehicle windshields to be increasingly curved and more steeply raked. Known windshield wiper systems incorporating a fixed length wiper blade having a fixed arc length wiper swing cannot clear a sufficient surface area of the windshield. Articulating wiper arms that extend and contract the wiper blade are known, but known designs are complex mechanisms that are costly to manufacture and complicated in operation.

Thus, while current vehicle wiper blade systems achieve their intended purpose, there is a need for a new and improved system and method for articulating automobile vehicle wiper blades.

SUMMARY

According to several aspects, an automobile vehicle wiper arm system includes a wiper arm base. A wiper arm extension is slidably disposed with respect to the wiper arm base. The wiper arm extension is slidably displaced in an outward direction and an inward direction opposite to the outward direction during rotation of the wiper arm base. A wiper blade is connected to the wiper arm extension, the wiper blade traversing an oval-shaped travel arc along a vehicle windshield by the slidable displacement of the wiper arm extension during rotation of the wiper arm base. A linkage group connects the wiper arm extension to a wiper motor wherein rotation of the wiper arm base is induced by operation of the wiper motor.

In another aspect of the present disclosure, the linkage group includes a motion link rotatably connected to the wiper arm extension and rotatably connected to a fixed vehicle structure by a rotational pin.

In another aspect of the present disclosure, the linkage group includes a pivot link rotatably connected to the wiper arm extension and to the wiper motor.

In another aspect of the present disclosure, the rotation of the wiper arm base concomitantly induces rotation of the motion link which induces sliding displacement of the wiper arm extension between a stored position and a maximum arc position.

In another aspect of the present disclosure, the linkage group includes a wiper motor link rotationally connected by a rotational pin to the wiper motor and rotationally connected to the pivot link.

In another aspect of the present disclosure, the linkage group includes an interconnection link positioned between and rotatably interconnected to both the wiper motor link and the pivot link.

In another aspect of the present disclosure, the linkage group includes a stabilizing link rotatably connected to both the pivot link and the interconnection link using a rotational pin.

In another aspect of the present disclosure, the stabilizing link is rotatably connected to a fixed structural member using a rotational pin.

In another aspect of the present disclosure, the wiper arm extension is slidably disposed within a bore of the wiper arm base and is extended and retracted in the outward direction and the inward direction with respect to a longitudinal axis of the wiper arm base.

In another aspect of the present disclosure, a bearing member is fixed in position on the wiper arm base with the wiper arm extension slidably disposed within the bearing member such that the wiper arm extension slides in the outward direction and the inward direction with respect to a longitudinal axis of the wiper arm base.

In another aspect of the present disclosure, a maximum extension of the wiper arm extension outwardly from the wiper arm base occurs at an arc-point defining a mid-point of the oval-shaped travel arc of the wiper blade.

According to several aspects, an automobile vehicle wiper arm system includes a wiper arm base rotatably connected to a fixed structural member. A wiper arm extension is slidably disposed with respect to the wiper arm base during travel of the wiper arm base about an arc of travel. A motion link is rotatably connected to the wiper arm extension and is rotatably connected to the fixed structural member, the motion link inducing the wiper arm extension to slidably displace in an outward direction and an inward direction opposite to the outward direction during rotation of the wiper arm base about the arc of travel. A wiper blade is connected to the wiper arm extension, the wiper blade traversing an oval-shaped travel arc along a vehicle windshield by the slidable displacement of the wiper arm extension during rotation of the wiper arm base. A linkage group connects the wiper arm extension to a wiper motor wherein rotation of the wiper arm base is induced by operation of the wiper motor.

In another aspect of the present disclosure, a linkage group connecting the wiper arm extension to the wiper motor wherein rotation of the wiper arm base is induced by operation of the wiper motor.

In another aspect of the present disclosure, the linkage group includes: a rotational pin rotatably connecting the motion link to the wiper arm extension; and a pivot link rotatably connected to the wiper arm extension and to the wiper motor.

In another aspect of the present disclosure, the linkage group includes a wiper motor link rotationally connected by a rotational pin to the wiper motor and rotationally connected to the pivot link.

In another aspect of the present disclosure, the linkage group includes one connection point of link rotation to the fixed structural member.

In another aspect of the present disclosure, the linkage group includes two connection points of link rotation to the fixed structural member.

According to several aspects, an automobile vehicle wiper arm system includes a wiper arm base rotatably connected to a fixed structural member. A wiper arm extension is slidably disposed with respect to the wiper arm base and slides parallel to a longitudinal axis of the wiper arm base during travel of the wiper arm base about an arc of travel. A motion link is rotatably connected to the wiper arm extension and is rotatably connected to the fixed structural member. The motion link induces the wiper arm extension to slidably displace in an outward direction and an inward direction opposite to the outward direction during rotation of the wiper arm base about the arc of travel. A wiper is blade connected to the wiper arm extension, the wiper blade traversing an oval-shaped travel arc along a vehicle windshield by the slidable displacement of the wiper arm extension during rotation of the wiper arm base. A linkage group connects the wiper arm extension to a wiper motor wherein rotation of the wiper arm base is induced by operation of the wiper motor.

In another aspect of the present disclosure, the linkage group includes at least two link members with the motion link and the at least two link members having two connection points of link rotation to the fixed structural member.

In another aspect of the present disclosure, the linkage group includes at least three link members with the motion link and the at least three link members having three connection points of link rotation to the fixed structural member. the linkage group includes at least three link members with the motion link and the at least three link members having three connection points of link rotation to the fixed structural member.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
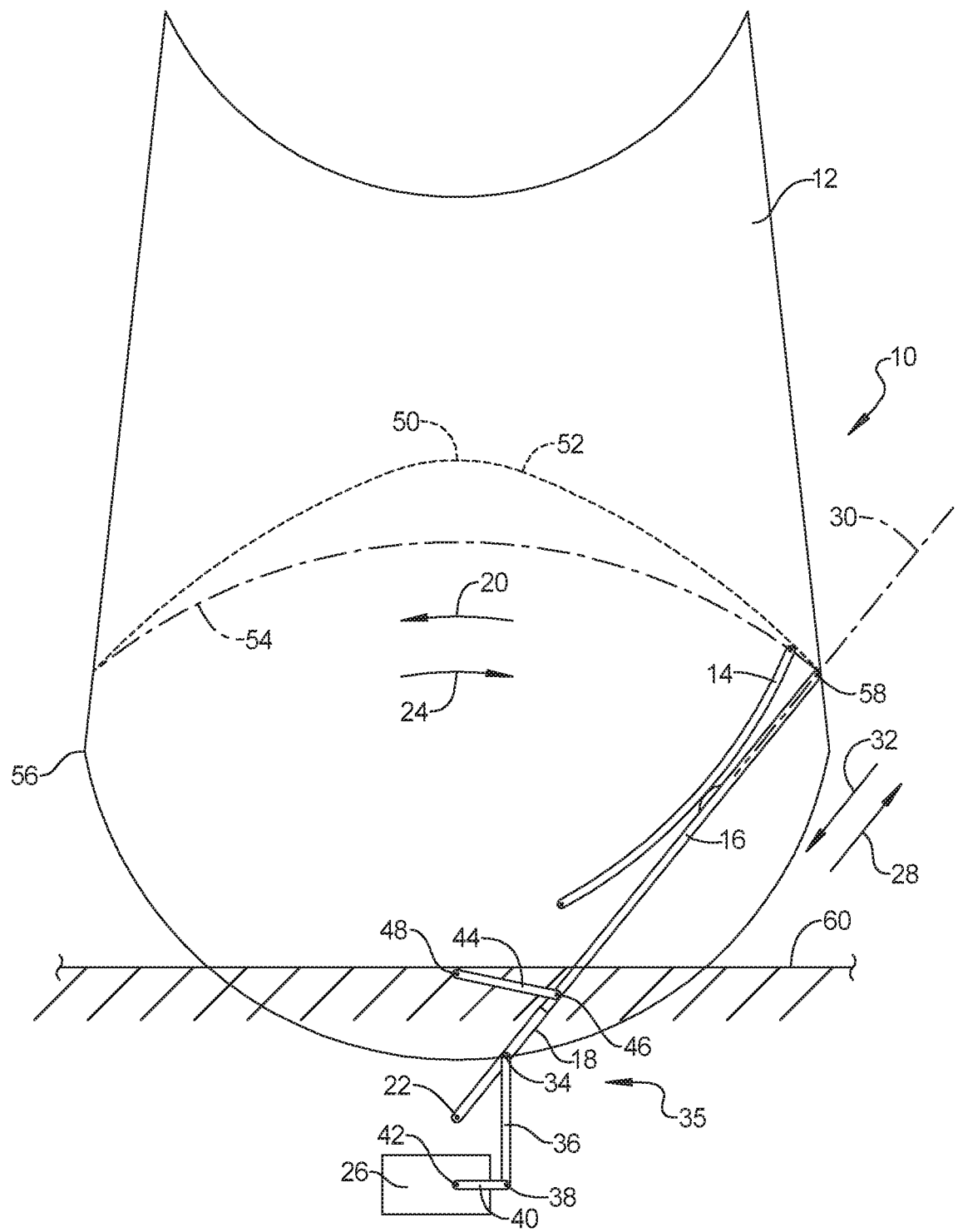
FIG. 1 is a front elevational view looking rearward of a wiper articulation system according to an exemplary aspect.

Referring to FIG. 1, a wiper articulation system 10 is provided for cleaning a surface area of an automobile vehicle windshield 12. The wiper articulation system 10 includes a wiper blade 14 of a known flexible material which is releasably connected to a wiper arm extension 16. The wiper arm base 18 rotates in a counterclockwise direction of rotation 20 with respect to first rotational pin 22 away from a normally stored position shown and returns in a clockwise direction of rotation 24 back to the stored position in response to operation of a wiper motor 26. The wiper arm extension 16 is slidably connected to the wiper arm base 18 and axially extends and retracts with respect to the wiper arm base 18 during rotation of the wiper arm base 18. The wiper arm extension 16 extends in an outward direction 28 with respect to a central longitudinal axis 30 of the wiper arm base 18 and slides parallel to the longitudinal axis 30 during wiper arm rotation. The wiper arm extension 16 is also retracted in an inward direction 32 opposite to the outward direction 28 with respect to the longitudinal axis 30 of the wiper arm base 18.

According to several aspects, the wiper articulation system 10 includes a linkage group 35 which control an angular range of motion of the wiper arm base 18 and the wiper arm extension 16. The linkage group 35 includes a second rotational pin 34 rotatably connecting a first pivot link 36 to the wiper arm base 18. The first pivot link 36 is rotatably connected by a third rotational pin 38 to a wiper motor link 40 of the linkage group 35. The wiper motor link 40 is rotationally connected by a fourth rotational pin 42 to the wiper motor 26. A motion link 44 of the linkage group 35 is rotatably connected by a fifth rotational pin 46 to the wiper arm extension 16. To ensure full extension of the wiper arm extension 16, the position of the fifth rotational pin 46 is outside of the wiper arm base 18 at all rotated positions of the wiper arm base 18 and at all extended or retracted positions of the wiper arm extension 16. At an opposite end of the motion link 44 with respect to the fifth rotational pin 46 is a sixth rotational pin 48. According to several aspects the first rotational pin 22, the fourth rotational pin 42 and the sixth rotational pin 48 are rotatably connected to fixed structure or to the windshield 12.

Operation of the wiper motor 26 initially induces a counterclockwise rotation of the motion link 44 with respect to an axis of rotation defined by the sixth rotational pin 48. As the motion link 44 rotates away from the stored position shown, connection of the fifth rotational pin 46 to the wiper arm extension 16 with the sixth rotational pin 48 fixed in position induces the wiper arm extension 16 to outwardly extend from the wiper arm base 18 in the outward direction 28. The induced outward sliding motion of the wiper arm extension 16 is maximum at an arc-point 50 of an oval or obround-shaped travel arc 52 traversed by the wiper blade 14 and the wiper arm extension 16 then retracts back toward the wiper arm base 18 for the remaining portion of the travel along the arc of rotation. According to several aspects, the arc-point 50 defines a mid-point of the travel arc 52. The oval-shaped travel arc 52 allows the wiper blade 14 to reach further upward along the surface of the windshield 12 than would otherwise occur during a semi-circular travel arc 54 of a known wiper blade system.

The wiper arm extension 16 and therefore the wiper blade 14 reach a maximum arc position 56 at a furthest counterclockwise rotation of the motion link 44 about the sixth rotational pin 48 which restrains further counterclockwise rotation of the wiper arm extension 16, and about the first rotational pin 22 which rotatably anchors the wiper arm base 18. The direction of rotation of the motion link 44 and therefore of the wiper arm extension 16 and the wiper blade 14 are then reversed to return the wiper articulation system 10 to its initial or normally stored position at an arc position 58 shown. One or more structural members 60 fixed to an automobile vehicle, which are presented as a common feature for clarity, provide anchor locations for the first rotational pin 22, the fourth rotational pin 42 and the sixth rotational pin 48. The structural members 60 can be fixed to automobile vehicles which include cars, vans, sport utility vehicles, pickup trucks, semi-trucks, and the like, as well as to boats, motorcycles, and the like vehicles having a windshield.

Figure 2:
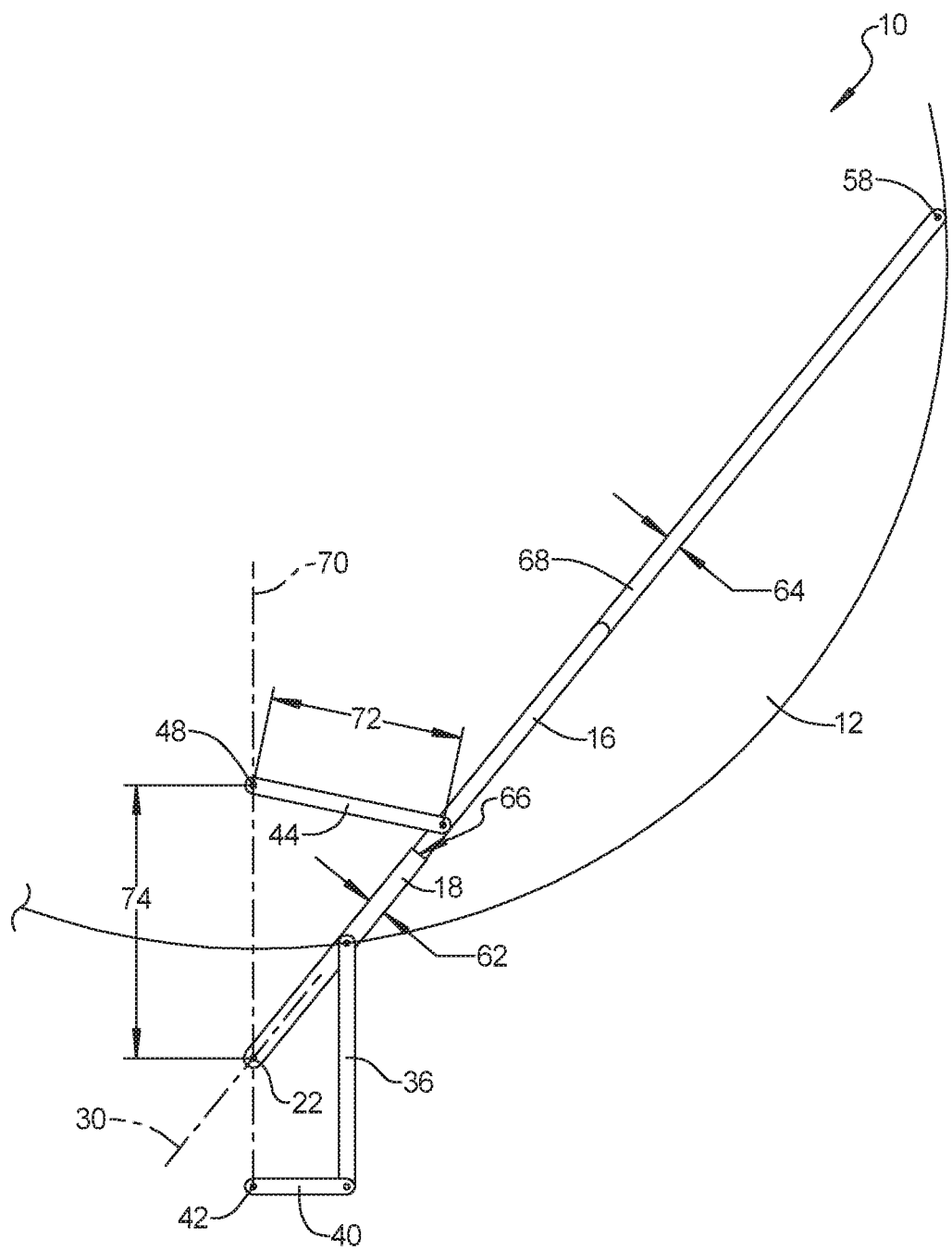
FIG. 2 is a front elevational view presenting selected components of FIG. 1.

Referring to FIG. 2 and again to FIG. 1, the first displacement end position or the stored arc position 58 of the wiper arm extension 16 is again presented. A first diameter 62 of the wiper arm base 18 is larger than a second diameter 64 of the wiper arm extension 16 allowing the wiper arm extension 16 to slidably fit within an inner bore 66 of the wiper arm base 18. A connector 68 is provided along the length of the wiper arm extension 16 to rotatably mount the wiper blade 14. Relationships between lengths, angles and spacings between the various links and the rotational pins can be varied to achieve different travel arcs and further or lesser extension of the wiper blade 16 as desired. As one example, according to several aspects the rotational axes of the first rotational pin 22, the fourth rotational pin 42 and the sixth rotational pin 48 are aligned on a common axis 70, which is vertically oriented as shown. According to further aspects the first rotational pin 22, the fourth rotational pin 42 and the sixth rotational pin 48 can be aligned on a common axis which is angularly oriented with respect to vertical, or the first rotational pin 22, the fourth rotational pin 42 and the sixth rotational pin 48 can be located at non-axial positions with respect to each other.

To affect rotational displacement and arc height, a relationship between link length and a spacing between the various links can also be varied within the scope of the present disclosure. For example, a length 72 of the motion link 44 can be equal to or varied from a distance 74 between the sixth rotational pin 48 and the first rotational pin 22. When the wiper motor 26 is energized, the wiper arm base 18 rotates counterclockwise causing the wiper arm extension 16 to also rotate counterclockwise as viewed in FIG. 2.

Referring to FIG. 3 and again to FIGS. 1 and. 2, a wiper articulation system 76 is modified from the wiper articulation system 10 to include two additional links and to have four connection points of link rotation to the fixed structural member 60 in lieu of the three connection points of link rotation to the fixed structural member 60 of the wiper articulation system 10. The wiper articulation system 76 includes features common with the wiper articulation system 10 which are therefore identified using an asterisk. The wiper articulation system 76 is shown in the stored position with the wiper arm extension 16' positioned at the stored arc position 58'. Additional features of the wiper articulation system 76 include a motor link 78 which defines an axis of rotation 80. The motor link 78 is rotatably connected to an interconnection link 82 using a rotational pin 84. A stabilizing link 86 is rotatably connected to both the first pivot link 36' and the interconnection link 82 using a rotational pin 88. The stabilizing link 86 is rotatably connected to a fixed structural member using a rotational pin 90. According to several aspects, the first rotational pin 22', the sixth rotational pin 48', the rotational pin 84 and the rotational pin 90 are individually connected to fixed structure.

Figure 3:
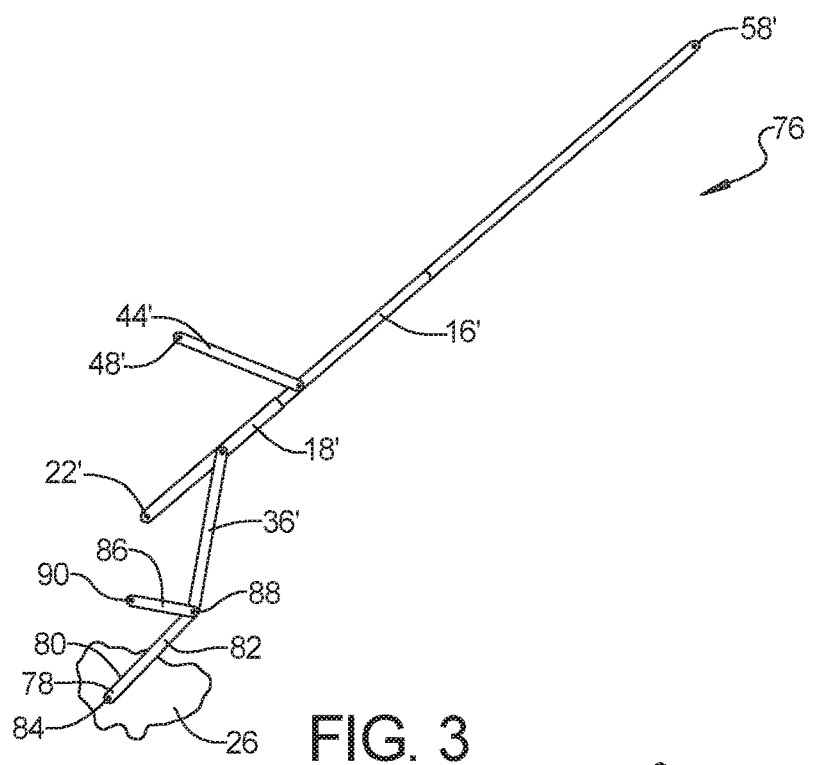
FIG. 3 is a front elevational view looking rearward of a wiper articulation system according to another aspect.

Referring to FIG. 4 and again to FIG. 3, by operation of the wiper motor 26, rotation of the motor link 78 approximately 90 degrees rotates the wiper arm base 18' and the wiper arm extension 16' approximately 45 degrees in a counterclockwise direction away from the stored position 58'. Other members such as the motion link 44' and the stabilizing link 86 may rotate less than 45 degrees. The wiper arm extension 16' begins to extend in the outward direction 28 with respect to the wiper arm base 18' during this rotational portion.

Figure 4:
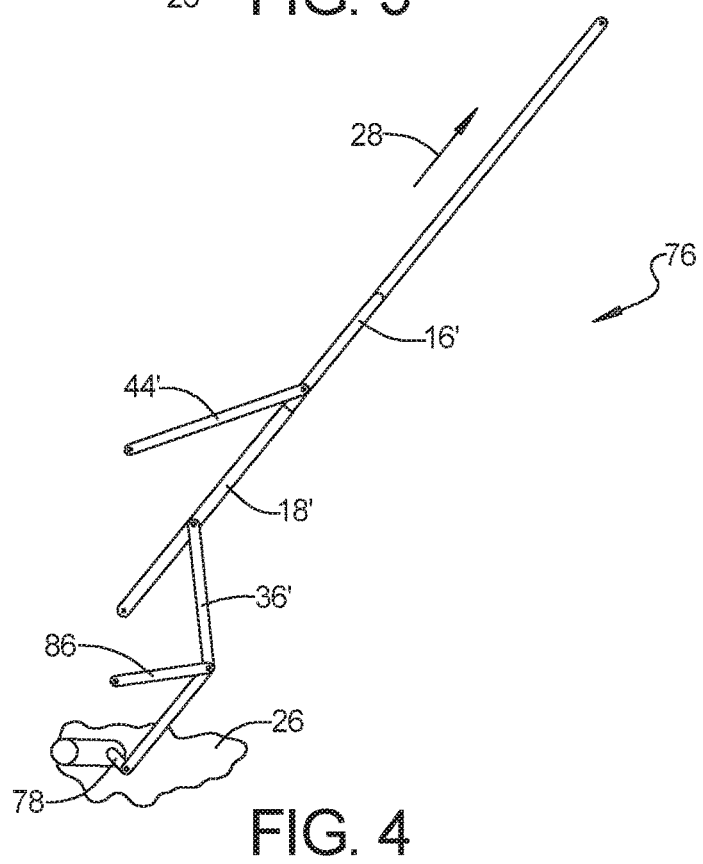
FIG. 4 is a front elevational view of the wiper articulation system of FIG. 3 showing wiper rotation away from the stored position of FIG. 3.
Figure 5:
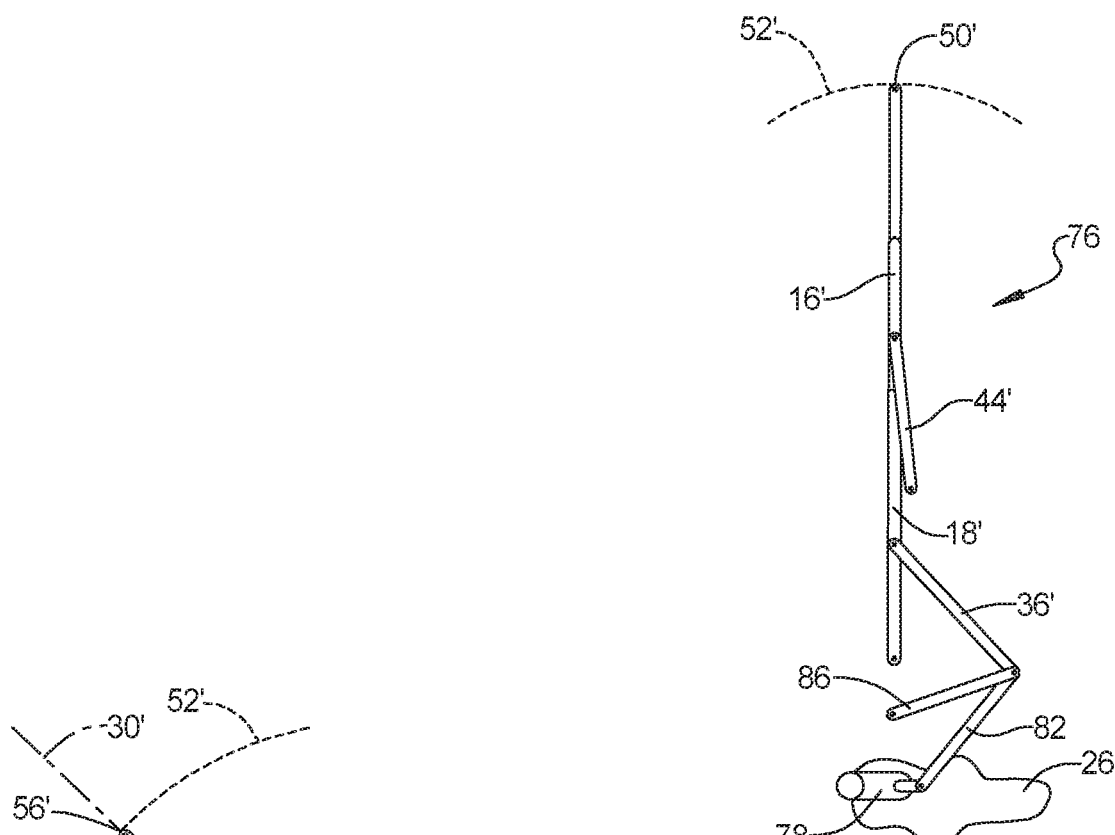
FIG. 5 is a front elevational view of the wiper articulation system of FIG. 3 showing wiper rotation at a maximum arc point of rotation.

Referring to FIG. 5 and again to FIGS. 1 and 3 through 4, similar to the wiper articulation system 10 the induced outward sliding motion of the wiper arm extension 16' is maximized at an arc-point 50' of an oval or obround-shaped travel arc 52' traversed by the wiper blade 14'. The motor link 78 has rotated approximately 135 degrees from its position with the wiper arm extension 16' at the stored position, however less rotation is used for the first pivot link 36', the interconnection link 82 and the stabilizing link 86 to reach this wiper arm extension position.

Figure 6:
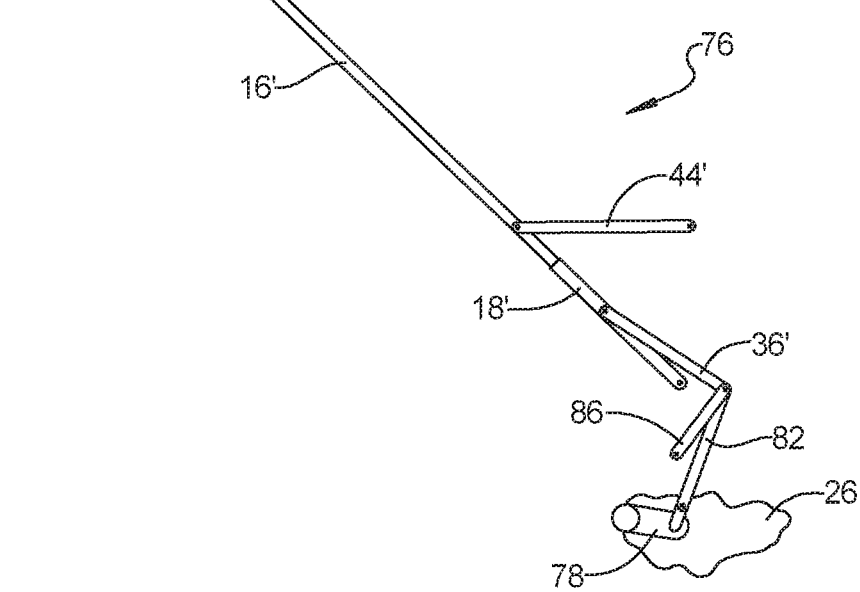
FIG. 6 is a front elevational view of the wiper articulation system of FIG. 3 showing wiper rotation at a maximum arc position of rotation.

Referring to FIG. 6 and again to FIGS. 1 and 3 through 5, the wiper arm extension 16' is shown at the maximum arc position 56' similar to the maximum arc position 56 described in reference to FIG. 1. The wiper arm extension 16' is retracted in the inward direction 32 opposite to the outward direction 28 along the longitudinal axis 30' of the wiper arm base 18'. The wiper motor is reversed to return the wiper articulation system 76 to the stored position shown in FIG. 3. At the maximum arc position 56' the motor link 78 has rotated approximately 180 degrees and the motion link 44' has rotated approximately 180 degrees from their positions when the wiper arm extension 16' was at the stored position shown in FIG. 3, however other links such as the first pivot link 36', the interconnection link 82 and the stabilizing link 86 have rotated less than 90 degrees during the rotation progression.

The oval-shape of the travel arcs 52, 52' traversed by the wiper articulation system 10 and the wiper articulation system 76 maximize a surface area cleared by the wiper blades 14, 14' during travel in the travel arcs 52, 52' between the stored positions and the maximum arc positions.

Figure 7:
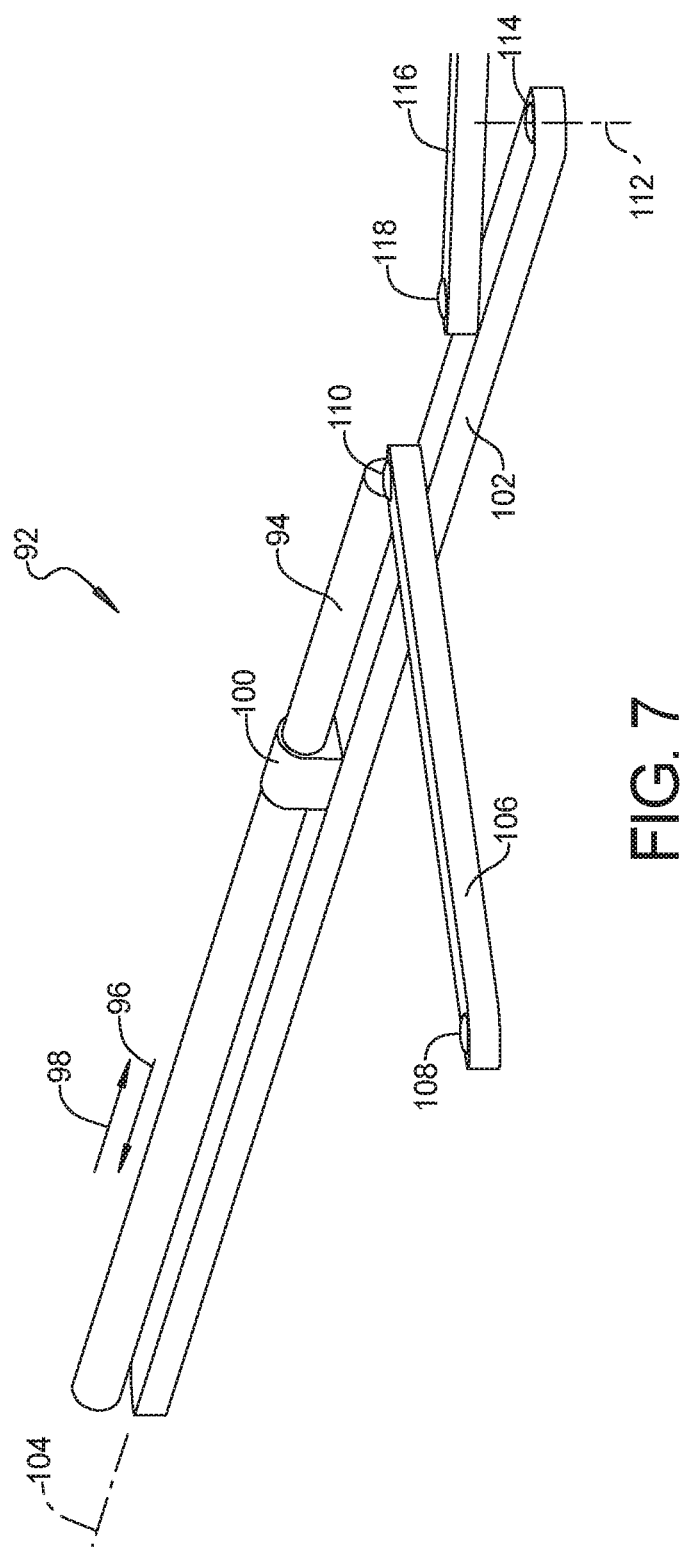
FIG. 7 is a top left perspective view of a wiper articulation system according to another aspect.

Referring to FIG. 7 and again to FIGS. 1 through 6, a wiper articulation system 92 is modified from the wiper articulation system 10 and the wiper articulation system 76, however similar operating principles will commonly apply. The wiper articulation system 92 includes a wiper arm extension 94 which slides in an outward direction 96 similar to the outward direction 28 and an inward direction 98 opposite to the outward direction 96. A wiper blade (not shown is connected to the wiper arm extension 94 similar to the wiper blade 14 described in reference to FIG. 1 and is therefore not further discussed herein.

The wiper arm extension 94 is slidably disposed within a bore of a bearing member 100 which is fixed in position on a wiper arm base 102 such that the wiper arm extension 94 slides in the outward direction 96 and the opposite inward direction 98 with respect to a longitudinal axis 104 of the wiper arm base 102. The wiper arm extension 94 is displaced by rotation of a motion link 106 similarly to the previously described motion link 44. The motion link 106 is rotatably connected at a first end by a rotational pin 108 similar to the rotational pin 48 and is connected at a second end to the wiper arm extension 94 by a rotational pin 110 similar to the rotational pin 46. The wiper arm base 102 is induced to rotate with respect to an axis of rotation 112 defined with respect to a rotational pin 114. Wiper arm base rotation is induced by a force acting from displacement of a pivot link 116 similar to the first pivot link 36 which is rotatably connected to the pivot link 116 by a rotational pin 118. The wiper arm extension 94 and the wiper arm base 102 both sweep through an arc of rotation similar to the travel arc 52 described in reference to FIG. 1 with the wiper arm extension 94 extending and retracting during rotation of the wiper arm base 102 in a similar manner as described in reference to the wiper arm extension 16.

A wiper arm system of the present disclosure offers several advantages. These include a wiper motion allowing for long and narrow windshields to be cleared effectively. This is accomplished by use of an articulation motion which allows for both extension and retraction of a wiper arm extension holding the wiper blade. The present wiper arm systems allow for a long and narrow windshield to be cleared by a single wiper arm.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle wiper arm system, comprising:
   a wiper arm base;
   a wiper arm extension slidably disposed with respect to the wiper arm base, the wiper arm extension slidably displaced in an outward direction and an inward direction opposite to the outward direction during rotation of the wiper arm base;
   a wiper blade connected to the wiper arm extension, the wiper blade traversing an oval-shaped travel arc along a vehicle windshield by the sliding displacement of the wiper arm extension during rotation of the wiper arm base; and
   a linkage group connecting the wiper arm extension to a wiper motor wherein rotation of the wiper arm base is induced by operation of the wiper motor;
   wherein the wiper arm base is rotatable about a first rotational pin and the linkage group is pivotally connected to the wiper arm base at a second rotational pin between the first rotational pin and the wiper arm extension, with the linkage group transmitting torque to the wiper arm base through the second rotational pin to facilitate rotation of the wiper arm base about the first rotational pin;
   wherein the linkage group includes a wiper motor link rotationally connected by a fourth rotational pin to the wiper motor;
   wherein the linkage group includes a motion link rotatably connected to the wiper arm extension and rotatably connected to a fixed vehicle structure by a sixth rotational pin; and
   wherein the first, fourth, and sixth rotational pins are translationally fixed relative to the fixed vehicle structure and are aligned along a common axis.

2. The automobile vehicle wiper arm system of claim 1, wherein the linkage group includes a pivot link rotatably connected to the wiper arm extension and to the wiper motor.

3. The automobile vehicle wiper arm system of claim 2, wherein the rotation of the wiper arm base concomitantly induces rotation of the motion link which induces sliding displacement of the wiper arm extension between a stored position and a maximum arc position.

4. The automobile vehicle wiper arm system of claim 2, wherein the wiper motor link is rotationally connected to the pivot link.

5. The automobile vehicle wiper arm system of claim 4, wherein the linkage group includes an interconnection link positioned between and rotatably interconnected to both the wiper motor link and the pivot link.

6. The automobile vehicle wiper arm system of claim 5, wherein the linkage group includes a stabilizing link rotatably connected to both the pivot link and the interconnection link using a rotational pin.

7. The automobile vehicle wiper arm system of claim 6, wherein the stabilizing link is rotatably connected to a fixed structural member using a rotational pin.

8. The automobile vehicle wiper arm system of claim 1, wherein the wiper arm extension is slidably disposed within a bore of the wiper arm base and is extended and retracted in the outward direction and the inward direction with respect to a longitudinal axis of the wiper arm base.

9. The automobile vehicle wiper arm system of claim 1, further including a bearing member fixed in position on the wiper arm base with the wiper arm extension slidably disposed within the bearing member with the wiper arm extension sliding in the outward direction and the inward direction with respect to a longitudinal axis of the wiper arm base.

10. The automobile vehicle wiper arm system of claim 1, wherein a maximum extension of the wiper arm extension outwardly from the wiper arm base occurs at an arc-point defining a mid-point of the oval-shaped travel arc of the wiper blade.

11. An automobile vehicle wiper arm system, comprising:
    a wiper arm base rotatably connected to a fixed structural member;
    a wiper arm extension slidably disposed with respect to the wiper arm base during travel of the wiper arm base in an arc of travel;
    a motion link rotatably connected to the wiper arm extension and rotatably connected to the fixed structural member by a sixth rotational pin, the motion link inducing the wiper arm extension to slidably displace in an outward direction and an inward direction opposite to the outward direction during rotation of the wiper arm base in the arc of travel;
    a wiper blade connected to the wiper arm extension, the wiper blade traversing an oval-shaped travel arc along a vehicle windshield by the sliding displacement of the wiper arm extension during rotation of the wiper arm base; and
    a linkage group connecting the wiper arm extension to a wiper motor wherein rotation of the wiper arm base is induced by operation of the wiper motor;
    wherein the wiper arm base is rotatable about a first rotational pin and the linkage group is pivotally connected to the wiper arm base at a second rotational pin between the first rotational pin and the wiper arm extension, with the linkage group transmitting torque to the wiper arm base through the second rotational pin to facilitate rotation of the wiper arm base about the first rotational pin;
    wherein the linkage group includes a wiper motor link rotationally connected by a fourth rotational pin to the wiper motor; and
    wherein the first, fourth, and sixth rotational pins are translationally fixed relative to the fixed structural member and are aligned along a common axis.

12. The automobile vehicle wiper arm system of claim 11, wherein the linkage group includes:
    a rotational pin rotatably connecting the motion link to the wiper arm extension; and
    a pivot link rotatably connected to the wiper arm extension and to the wiper motor.

13. The automobile vehicle wiper arm system of claim 12, wherein the wiper motor link is rotationally connected to the pivot link.

14. The automobile vehicle wiper arm system of claim 11, wherein the linkage group includes one connection point of link rotation to the fixed structural member.

15. The automobile vehicle wiper arm system of claim 11, wherein the linkage group includes two connection points of link rotation to the fixed structural member.

16. An automobile vehicle wiper arm system, comprising:
    a wiper arm base rotatably connected to a fixed structural member;
    a wiper arm extension slidably disposed with respect to the wiper arm base and slides parallel to a longitudinal axis of the wiper arm base during travel of the wiper arm base in an arc of travel;
    a motion link rotatably connected to the wiper arm extension and rotatably connected to the fixed structural member by a sixth rotational pin, the motion link inducing the wiper arm extension to slidably displace in an outward direction and an inward direction opposite to the outward direction during rotation of the wiper arm base in the arc of travel;

a wiper blade connected to the wiper arm extension, the wiper blade traversing an oval-shaped travel arc along a vehicle windshield by the sliding displacement of the wiper arm extension during rotation of the wiper arm base; and a linkage group connecting the wiper arm extension to a wiper motor wherein rotation of the wiper arm base is induced by operation of the wiper motor;

wherein the wiper arm base is rotatable about a first rotational pin and the linkage group is pivotally connected to the wiper arm base at a second rotational pin between the first rotational pin and the wiper arm extension, with the linkage group transmitting torque to the wiper arm base through the second rotational pin to facilitate rotation of the wiper arm base about the first rotational pin;

wherein the linkage group includes a wiper motor link rotationally connected by a fourth rotational pin to the wiper motor; and wherein the first, fourth, and sixth rotational pins are translationally fixed relative to the fixed structural member and are aligned along a common axis.

17. The automobile vehicle wiper arm system of claim 16, wherein the linkage group includes at least two link members with the motion link and the at least two link members having two connection points of link rotation to the fixed structural member.

18. The automobile vehicle wiper arm system of claim 16, wherein the linkage group includes at least three link members with the motion link and the at least three link members having three connection points of link rotation to the fixed structural member.

* * * * *